Nov. 3, 1959  R. F. OXLEY  2,911,460
FITTINGS FOR ATTACHMENT TO PERFORATED MEMBERS
Filed Aug. 3, 1956

INVENTOR
ROBERT F. OXLEY

BY Watson, Cole, Grindle &
    Watson  ATTORNEY

United States Patent Office 2,911,460
Patented Nov. 3, 1959

2,911,460

FITTINGS FOR ATTACHMENT TO PERFORATED MEMBERS

Robert F. Oxley, Ulverston, England

Application August 3, 1956, Serial No. 602,038

1 Claim. (Cl. 174—153)

This invention relates to fittings for attachment to perforated members.

It is an object of the invention to provide a simple and inexpensive fitting which may have many uses. For instance, in electrical equipment such a fitting may be used as a lead-through insulator for passing an insulated conductor through the chassis or other part of the electrical equipment which the conductor must not touch, or as a stand-off insulator which provides a rigid insulated anchorage point for conductors. On the other hand, the fittings are also useful for purely mechanical purposes, for instance for attaching some article to a perforated member.

According to the present invention, a fitting for attachment to the perforated member comprises a bushing of deformable material which can be pushed part way through a hole in the member until an external projection on the bushing comes up against the edge of the hole on one side of the member and one end of the bushing projects beyond the hole on the other side of the member, and a pin having an enlargement bigger than the bore of the bushing which can be forced into the bore of the bushing until the enlargement lies beyond the hole in the member and expands the projecting end of the bushing to prevent withdrawal of the bushing from the hole, in which position at least one end of the pin projects from the bushing.

Thus, the bushing is firmly secured to the member. The projecting end or ends of the pin can be used for any desired purpose. For instance, for a lead-through insulator the bushing will be one in which the bore extends right through the bushing and the pin will be longer than the bushing and so arranged that when it is fully inserted both ends of the pin project from the bushing. Conductors can then be secured to both ends of the pin by soldering or otherwise. For a stand-off insulator it is preferred to use a blind bushing. In this case the pin will not project right through the bushing but will have only one end projecting, to which the conductors can be fastened by soldering or otherwise. For a mechanical fastening the pin may be arranged to project either at one or both ends of the bushing, the projecting end or ends being shaped to suit the purpose in view.

Preferably, the enlargement of the pin which expands the projecting end of the bushing is barb-like, to facilitate its insertion and to resist withdrawal when it has been inserted. Thus, the enlargement may be conical or wedge-shaped in form with the cone or wedge point in the direction of insertion of the pin.

It is desirable to provide a flange or a shoulder on the pin to prevent its being forced too far into the bushing. This is preferably conical or wedge-shaped so that it partly enters the bore of the bushing when the spigot has been inserted for the proper distance.

The material used for the bushing should be sufficiently plastic or resilient to expand without splitting when the pin is forced into it. For fittings for use in electrical equipment the material of the bushing should also be a good insulator, a suitable material for this purpose being polytetrafluoroethylene.

The pin may be made of any suitable material, preferably metal. For use in electrical equipment a metal which is easily solderable and is a good conductor of electricity, such as copper or brass, is preferred. It may be stamped out of sheet metal, in which case it will have a non-circular cross-section so that it will not be rotatable in the bushing, which is advantageous for certain applications.

The invention may be performed in various ways, and one particular fitting embodying the invention, and a modified form of pin, will now be described by way of example with reference to the accompanying drawings, in which.

Figures 1, 2:
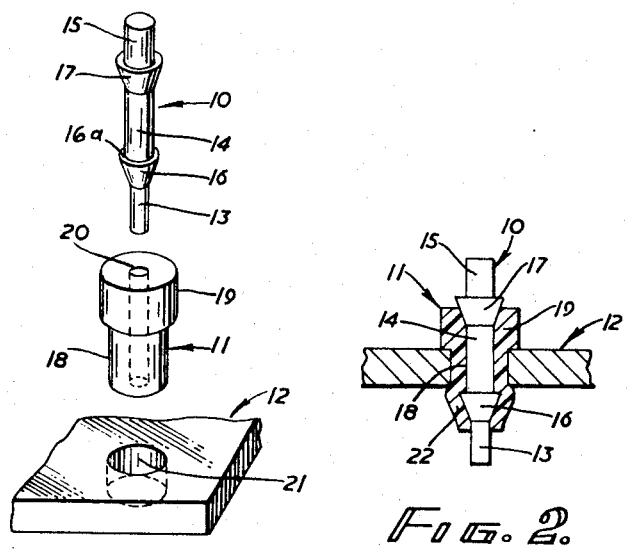
Figure 1 is an "exploded" perspective view of the said fitting.
Figure 2 is a sectional view of the fitting shown in Figure 1 when installed in a perforated member.

The fitting shown in Figures 1 and 2 comprises a pin 10 and a bushing 11 adapted for attachment to a perforated member 12, for instance the chassis of a radio set or other piece of electrical equipment, to constitute an insulated lead-through conductor.

The pin 10 is made of metal and is of circular cross-section. It comprises an end portion 13 of relatively small diameter, a central portion 14 of somewhat larger diameter and an end portion 15 of approximately the same diameter as the central portion 14. Between the portions 13 and 14 there is an enlargement 16 in the form of a barb-like or conical or wedge-shaped formation, and there is a similar but slightly larger formation 17 between the portions 14 and 15.

The bushing 11 is made of a deformable insulating material, conveniently polytetrafluoroethylene, and comprises a cylindrical portion 18 and a flange 19. A bore 20 of approximately the same diameter as the central portion 14 of the spigot extends right through the bushing 11.

The perforated member 12 is provided with a hole 21 of approximately the same diameter as the cylindrical portion 18 of the bushing.

The length of the cylindrical portion 18 of the bushing is somewhat greater than the length of the hole 21 so that, when the bushing is inserted into the hole with the flange 19 resting against the edge of the hole 21 on one side of the member 12, the other end of the bushing will project beyond the hole 21 on the other side of the member 12.

When the bushing has been inserted into this position, the pin 10 is pushed into the bore 20 of the bushing until it occupies the position shown in Figure 2. The bushing, being made of deformable material, permits the insertion of the pin in this manner.

When the pin has been so inserted, the enlargement 16 expands the projecting end of the bushing into a bulb-like form as shown at 22, which holds the bushing firmly in place. The formation 17, which is forced partly into the other end of the bushing, increases the firmness of the fixing and prevents any further significant endwise movement of the pin in the bushing.

The wedge-shaped enlargement or shoulder 17, due to having its converging edge portion received in the bore of the bushing, tends to expand the resilient material around the bore. In turn, the expanded bushing coacts with the converging surface of the shoulder 17 to exert an upward retractive force on the shoulder and the pin 14. This is resisted by engagement of the flat annular face a of the enlargement 16 with the inner surface of the bore. It will thus be seen that the retractive force tends to firmly seat the flat face 16a against the interior surface of the bushing in the maner of a barb, thus enabling the pin 14 more efficiently to retain the bushing in its operative position. Moreover, the retractive force resulting from coaction between the resiliently enlarged end of the bushing and the converging surface of shoulders 14 will inherently tend to longitudinaly compress and to thereby increase the bulging of the resilient bushing at 22 to better resist traction upwardly of the bushing through the mounting wall 12.

Conductors can readily be secured to the end portions 13 and 15 of the pin, for instance by soldering.

It it is desired to use a similar fitting as a stand-off insulator, the end portion 13 of the pin is omitted or removed and a "blind" bushing, in which the projecting end is blanked off, is substituted.

Figure 3:
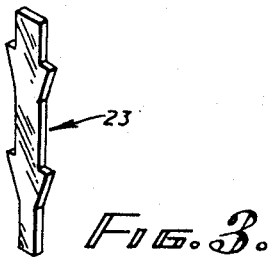
Figure 3 is a perspective view of the modified form of pin.

The modified form of pin 23 illustrated in Figure 3, is of rectangular cross-section, and can be made, for instance, as a stamping from sheet metal.

What I claim as my invention and desire to secure by Letters Patent is:

A fitting comprising a mounting wall having an aperture therethrough and upper and lower surfaces, a bushing of resiliently deformably material, said bushing having a longitudinal bore, a large portion too big to enter said aperture and engaging said upper surface of said mounting wall and a small portion extending from said large portion through said aperture and projecting beyond said lower surface, and a pin lying partly within said bore and having an enlargement bigger than said bore, said enlargement lying within the projecting portion of said bushing beneath said lower surface and expanding said projecting portion radially to prevent its retraction through said aperture, said enlargement being of frusto-conical shape diverging toward the said lower surface of the mounting wall and terminating in spaced relation beneath said mounting wall in a flat annular face, said pin having a wedge shaped shoulder above the upper surface of said mounting wall converging toward said enlargement, the converging end portion of said shoulder being of larger size than said bore disposed in said bore and resiliently expanding said large portion of said bushing around said bore.

References Cited in the file of this patent
UNITED STATES PATENTS

| | | |
|---|---|---|
| 2,433,911 | Johnston | Jan. 6, 1948 |
| 2,774,812 | Clark | Dec. 18, 1956 |
| 2,785,219 | Rudner | Mar. 12, 1957 |
| 2,806,080 | Corey | Sept. 10, 1957 |